May 12, 1931.    E. A. GALLISON ET AL    1,804,977
CUTTING IMPLEMENT
Filed Jan. 25, 1928
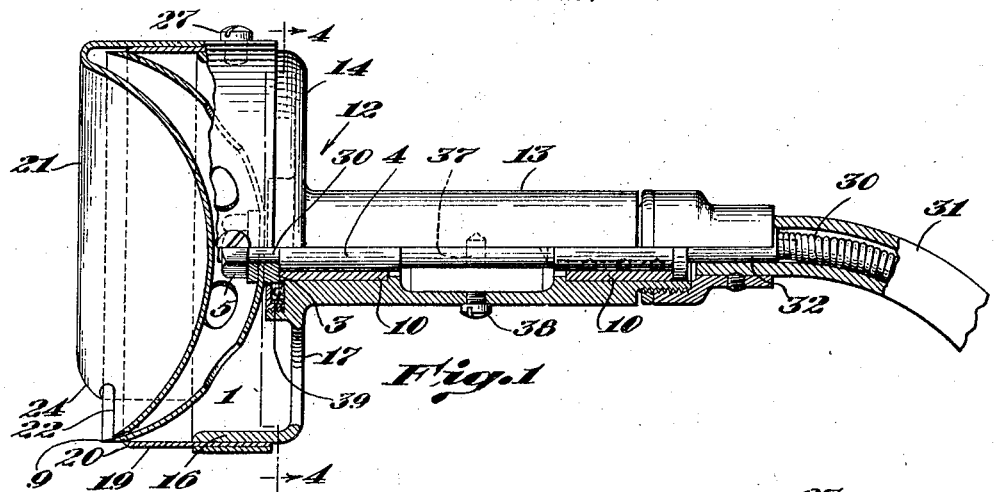
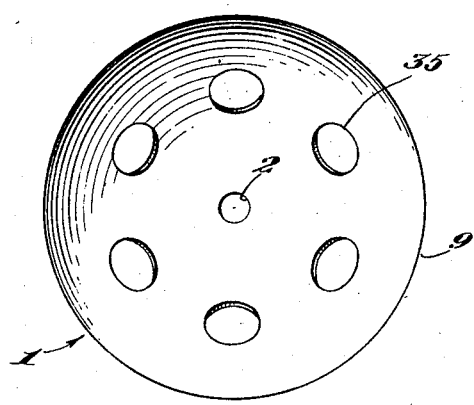
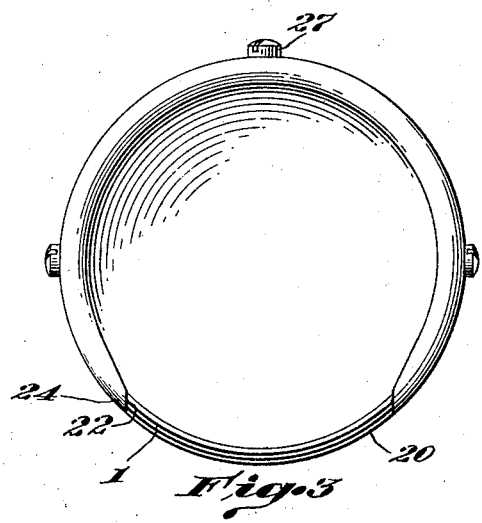
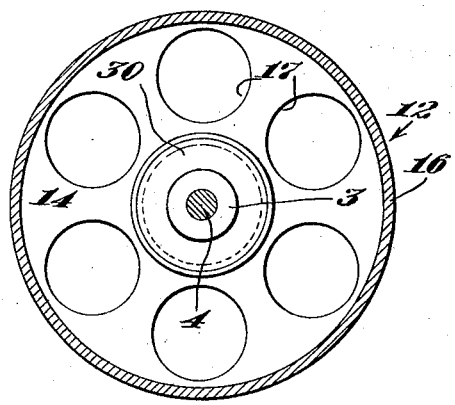
Inventors
Albert S. MacDonald
Ernest A. Gallison
by Roberts Cushman & Woodbury
Att'ys.

Patented May 12, 1931

1,804,977

UNITED STATES PATENT OFFICE

ERNEST A. GALLISON, OF WATERTOWN, AND ALBERT S. MacDONALD, OF QUINCY, MASSACHUSETTS, ASSIGNORS, BY MESNE ASSIGNMENTS, TO BAY STATE FISHING COMPANY, OF BOSTON, MASSACHUSETTS, A CORPORATION OF MASSACHUSETTS

CUTTING IMPLEMENT

Application filed January 25, 1928. Serial No. 249,361.

This invention relates to cutting implements and more particularly to devices of this character which have a power driven cutter or knife and are adapted to be held and guided by the hand of the user. A knife of this type is particularly useful for trimming fish fillets or for analogous uses where it is desirable to cut thin slices of flesh from a fairly large piece of the same.

The present invention discloses an implement which is of convenient size and which may be driven by a flexible shaft so that it may be readily moved from point to point and readily manipulated by the operator. The knife is provided with suitable guards and guiding elements so that only a small portion of its annular cutting edge is exposed, one of the guards being arranged to receive the slice or shaving that is cut by the exposed portion of the knife and to divert the same from the cutting edge. Another guiding element and guard is arranged to prevent cutting for any substantial distance except at a substantially small angle to the surface which is being engaged by the guard, thus the guard may be slid over the surface of the fillet which is being trimmed and the knife will only cut a comparatively thin slice or shaving therefrom. The various elements of the cutter are arranged to be removable and to permit convenient cleaning of the device or the ready replacement of parts. An implement of this character is inexpensive to manufacture and operate and is compartively simple in construction while being designed to protect the operator against any serious accident due to the use of the same.

Further objects and advantageous features of the invention will be apparent to those skilled in the art upon a reading of the subjoined description and claims in conjunction with the accompanying drawings, in which;

Fig. 1 is a view partly in side elevation and partly in central longitudinal section of the improved cutting device, certain parts being broken away for clarity of illustration;

Fig. 2 is an elevational view of the cup-shaped cutting knife;

Fig. 3 is a front elevational view of the assembled cutting implement; and

Fig. 4 is a section on 4—4 of Fig. 1.

A cutting implement of the type exemplified in the accompanying drawings may preferably comprise a cupped cutter or knife 1, the intermediate portion of which may be provided with an opening 2 to receive an extension 3 of a short driving shaft 4, while a suitable fastening element, such as the nut 5, holds the knife upon the shaft. The knife preferably is formed of sheet metal and has a concave-convex contour so that its annular cutting edge 9 lies substantially parallel with the axis of rotation of shaft 4.

Shaft 4 is supported in suitable bearings 10 which are carried by a suitable housing, designated in general by the numeral 12. This housing has an elongate cylindrical portion 13 enclosing the shaft 4 and supporting bearings 10, and has an enlarged cup-shaped portion 14 adjoining the extension 3 of shaft 4. An opening in elongate portion 13 of the housing normally receives a screw 38. This may be removed to permit the introduction of lubricant or of a tool to engage opening 37 in shaft 4, thus facilitating the tightening of nut 5. The enlarged portion of the housing has an annular wall 16 with a diameter substantially equal to the maximum diameter of the knife 1. Suitable openings 17 are provided between the elongate cylindrical portion of casting 12 and the outer annular portion 16 while there is a series of openings 35 in the cutter; these openings permit the removal of severed fragments which might otherwise gather within the device. A metal shield 30 is secured to member 12 adjoining shaft 4 and serves as a guard to prevent fragments from passing into the region of the bearings, while enclosing suitable fibrous lubricant-retaining material 39.

Secured to the annular portion 16 of the member 12 is a combined guide and guard member 19 which may conveniently be of sheet metal and which may have its outer edge 20 beveled, and juxtaposed to the cutting edge of the knife so that there is but little opportunity for severed fragments to pass between the cutter and the edge of guard 19.

A second guard member 21 is secured upon the outer face of member 19 and extends beyond the same, enclosing a substantial segmental portion of the cutting edge and having a cupped portion corresponding to the cupped knife itself, but spaced outwardly in relation thereto. The lower part of member 21, which adjoins the knife, is cut away, as designated by numeral 22 to expose a small segmental portion of the cutting edge for cutting purposes, while a beveled edge of member 21 is juxtaposed to the inner side of the exposed knife portion. The guard 21 is turned in, as designated by numeral 24, at either side of this cut-away portion in order substantially to prevent the movement of severed portions into the space between the member 21 and the knife as a well to prevent rotating of the entire implement in relation to the article being cut. Detachable fastening elements 27 secure member 21 to members 12 and 19 so that the outer guard may be readily removed to permit cleaning of this portion of the implement.

The shaft 14 may be driven from any suitable source of power, such as an electric motor mounted upon a fixed stand and connected to the shaft 4 by means of a flexible drive line 30 of a type conventionally used for small power tools, speedometers or the like. This flexible drive member is enclosed in a flexible housing 31 and carries a suitable stub shaft 32, secured to the end of the shaft 4.

In the use of a cutting implement of this character, the cylindrical portion 13 of the device will be grasped by one hand of the operator and used as a handle properly to hold and guide the cutting edge of knife 1. The cylindrical elements 16 and 19 serve to guard this cutting edge so that only a comparatively thin slice can be cut from the object which is being trimmed and so that the effective cutting edge lies substantially parallel to the normal cutting path. The cupped guard 21 is so arranged that the severed slice or shaving is directed upwardly along a curved path and thus gradually diverted from the region of the cutting edge and prevented from clogging the rotating parts of the implement. Furthermore the guide elements serve to protect the operator against serious injury since only a small part of the cutting edge is exposed, and furthermore since it is impossible for the exposed portion of the cutting edge to cut deeply into the flesh, due to the arrangement of the guard elements; in other words it is necessary for the workman to push the knife in a direction substantially parallel to the axis of rotation of the knife in order to cause the latter to cut effectively. Obviously the openings 17 and the detachable guard 21 facilitate removal of fragments of fish which may become lodged in the vicinity of the rotating parts during a comparatively long period of use. The provision of a flexible drive shaft for an implement of this character permits the workman to guide the cutter as may appear desirable.

In practice, an implement of this character has been found particularly advantageous in permitting the rapid trimming of ribs or other undesirable portions from the fillets of fish, from which the backbone and larger bones have previously been removed mechanically or otherwise. In such a case, the workman may grasp the fillet in one hand and guide and direct the cutting implement in the other, thus easily and quickly trimming off thin slices or shavings of inedible flesh. Obviously, however, a device of this character has many analogous uses and its utility is not confined to this particular art.

We claim:

1. A cutting implement of the class described, comprising a rotary cup-like knife and having an annular cutting edge, a plurality of openings spaced inwardly from the edge of the knife, a drive shaft secured to the mid-portion of the knife, an annular guide and guard surrounding the knife, a handle surrounding the shaft and forming a continuation of said guide and guard, and a guard portion protecting the major segmental portion of the cutting edge, said guide and guard being connected to said handle by a wall at the rear of the knife, said wall having openings therein.

2. A cutter of the class described comprising a drive shaft, a cutter having a substantially cylindrical cutting edge disposed concentrically with respect to the drive shaft, means connecting the drive shaft and cutter, a handle surrounding the drive shaft and supporting the same, a guard member connected with said handle and surrounding the knife, and a second guard member protecting the major segmental portion of the cutting edge, said second guard member having a concave face adapted to divert slices and shavings of material from the cutting edge.

3. A cutting implement of the class described comprising a rotary, cup-like knife having an annular cutting edge, a drive shaft disposed concentrically with the cutting edge and secured to the mid portion of the knife, a combined guide and guard member surrounding the knife, a handle surrounding the shaft and supporting said guide and guard member, and a cupped guard fitting within said cupped knife and arranged to guide portions cut by said knife away from its cutting edge, said guard also protecting the major segmental portion of the cutting edge.

4. A cutting implement of the class described comprising a rotary, cup-like knife having an annular cutting edge, a drive shaft disposed concentrically with the cutting edge and secured to the mid portion of the knife, a combined guide and guard member, a handle surrounding the shaft and supporting said guide and guard member, and a cupped guard fitting within said cupped knife and arranged to guide portions cut by said knife away from its cutting edge, said guard being detachably secured to said guide and guard member and protecting the major segmental portion of the cutting edge.

Signed by us at East Boston, Massachusetts this 18th day of January, 1928.

ALBERT S. MacDONALD.
ERNEST A. GALLISON.